US012741820B2

(12) United States Patent
Otsuka et al.

(10) Patent No.: US 12,741,820 B2
(45) Date of Patent: Sep. 22, 2026

(54) TRANSPORT FACILITY

(71) Applicant: Daifuku Co., Ltd., Osaka (JP)

(72) Inventors: Hiroshi Otsuka, Hinocho (JP); Keisuke Shiroishi, Hinocho (JP); Tomotaka Kinugawa, Hinocho (JP)

(73) Assignee: Daifuku Co., Ltd., Osaka (JP)

(*) Notice: Subject to any disclaimer, the term of this patent is extended or adjusted under 35 U.S.C. 154(b) by 64 days.

(21) Appl. No.: 18/910,488

(22) Filed: Oct. 9, 2024

(65) Prior Publication Data

US 2025/0115435 A1 Apr. 10, 2025

(30) Foreign Application Priority Data

Oct. 10, 2023 (JP) ................................ 2023-175096

(51) Int. Cl.
*B65G 17/00* (2006.01)
*H10P 72/30* (2026.01)

(52) U.S. Cl.
CPC ................................ *B65G 17/005* (2013.01)

(58) Field of Classification Search
None
See application file for complete search history.

(56) References Cited

U.S. PATENT DOCUMENTS 6,629,502 B2 * 10/2003 Matsukawa ............. E01B 25/06 104/96
7,669,533 B2 * 3/2010 Kyutoku ................ E01B 25/26 104/130.09
8,978,562 B2 * 3/2015 Nagamine ............... E01B 25/26 104/91
9,758,308 B1 * 9/2017 Nishikawa .......... H10P 72/0612
9,896,275 B2 * 2/2018 Ikenaga ................. B65G 43/00
9,902,565 B2 * 2/2018 Murakami .............. B60L 5/005
10,023,205 B2 * 7/2018 Kinugawa ................. B61B 3/02
10,940,878 B2 * 3/2021 Murakami ............ B61L 23/041
2010/0242783 A1 * 9/2010 Oguro ................. H10P 72/3208 104/91
2010/0242784 A1 * 9/2010 Oguro ................. H10P 72/3208 104/130.01

(Continued)

FOREIGN PATENT DOCUMENTS

JP 201980411 A 5/2019
JP 2023134103 A 9/2023

(Continued)

*Primary Examiner* — Gene O Crawford
*Assistant Examiner* — Muhammad Awais
(74) *Attorney, Agent, or Firm* — The Webb Law Firm

(57) ABSTRACT

A transport facility includes a travel rail along a travel path, a transport vehicle, and a guide rail disposed along the travel path separately from the travel rail to guide the transport vehicle. The transport vehicle includes a vehicle body, a guided portion guidable by the guide rail, at least one travel wheel supported on the vehicle body to roll on an upper surface of the travel rail, and at least one rise restrictor supported on the vehicle body. The guide rail is disposed in at least one of an intersecting section or a curved section of the travel path without being disposed in a straight section of the travel path. The rise restrictor faces, from below, a guide rail lower surface of the guide rail in a section in which the guide rail is disposed and contacts the lower surface in response to a rise of the vehicle body.

5 Claims, 5 Drawing Sheets

(56) References Cited

U.S. PATENT DOCUMENTS

| | | | | |
|---|---|---|---|---|
| 2017/0183154 | A1* | 6/2017 | Kinugawa | B65G 1/0457 |
| 2017/0229333 | A1* | 8/2017 | Kinugawa | H10P 72/3208 |
| 2019/0122910 | A1* | 4/2019 | Ogawa | H10P 72/0606 |
| 2023/0192412 | A1* | 6/2023 | Otsuka | B65G 35/06<br>198/465.1 |
| 2023/0286551 | A1* | 9/2023 | Kobayashi | B61B 3/00 |

FOREIGN PATENT DOCUMENTS

| | | | |
|---|---|---|---|
| KR | 1020170105197 | A | 9/2017 |
| KR | 102366068 | B1 | 2/2022 |

* cited by examiner 100
1
9
92
93
12
13
82,8
81,8
11a,11
24a,24
26a,26
3
26c,26
24b,24
41,21
42,21
26b,26
26d,26
X
Y
Y1
Y2

100
9
93
26b,26
11b,11
Y2
Y
X
Y1
26d,26
42,21
41,21
26a,26
24a,24
14
26c,26
24b,24
92
93
13
81,8
82,8
X
Y1
Y
Y2

3
74
76
29
P1
P2
36b,36
41,21
24a,24
36a,36
26b,26
M
32,30
36b,36
24b,24
42,21
36a,36
26d,26
29
26a,26
43
31,30
M
26c,26
44
W
X
1
82a,82,8
81a,81,8
Y
Y1
Y2

TRANSPORT FACILITY

CROSS-REFERENCE TO RELATED APPLICATION

This application claims priority to Japanese Patent Application No. 2023-175096 filed Oct. 10, 2023, the disclosure of which is hereby incorporated by reference in its entirety.

BACKGROUND OF THE INVENTION

Field of the Invention

The present invention relates to a transport facility including a travel rail along a travel path, a transport vehicle that travels along the travel path, and a guide rail disposed along the travel path separately from the travel rail to guide the transport vehicle.

Description of Related Art

For example, Japanese Unexamined Patent Application Publication No. 2019-080411 (Patent Literature 1) describes a technique for a transport facility. Reference signs in parentheses used hereafter in describing the background are the reference signs in Patent Literature 1.

A transport facility described in Patent Literature 1 includes travel rails (2) along a travel path (1), transport vehicles (article transport vehicles 3) that travel along the travel path (1), and guide rails (21) that guide the transport vehicles. Each transport vehicle includes a vehicle body (traveler 9), guided portions (19) guidable by the guide rails (21), and travel wheels (15) supported on the vehicle body to roll on the travel rails (2). The guide rails (21) are arranged at, for example, branches (7) on the travel path (1). The transport vehicle travels in, for example, a straight direction or a branching direction at each branch (7), with the guided portions (19) guided by the guide rails (21).

In the transport facility described above, the travel rails and the guide rails tend to have more complex shapes in intersecting sections or curved sections of the travel path than in straight sections of the travel path. Thus, an error in the installation position of the rails or an error in the attachment position of the travel wheels and the guided portions with respect to the vehicle body can easily cause a rise of the vehicle body. Such a rise can apply a large load to the travel wheels and the vehicle body supporting the travel wheels, and can easily damage or degrade the components of the transport vehicle including the travel wheels and the vehicle body.

SUMMARY OF THE INVENTION

One or more aspects are directed to a transport facility that can appropriately reduce a rise of the body of the transport vehicle.

A transport facility according to an aspect of the disclosure includes a travel rail along a travel path, a transport vehicle that travels along the travel path, and a guide rail disposed along the travel path separately from the travel rail to guide the transport vehicle. The transport vehicle includes a vehicle body, a guided portion guidable by the guide rail, at least one travel wheel supported on the vehicle body to be rollable on an upper surface of the travel rail, and a rise restrictor supported on the vehicle body. The guide rail is disposed in at least one of at least one intersecting section of the travel path or a curved section of the travel path without being disposed in a straight section of the travel path. The at least one rise restrictor faces, from below, a guide rail lower surface being a downward-facing surface of the guide rail in a section in which the guide rail is disposed. The at least one rise restrictor comes in contact with the guide rail lower surface from below in response to a rise of the vehicle body.

In this structure, in the section of the travel path in which the guide rail is disposed, the rise restrictor may come in contact with the guide rail lower surface from below when the vehicle body starts rising, restricting the rise of the vehicle body. This reduces damage or degradation of the components of the transport vehicle resulting from a rise of the vehicle body.

In this structure, the guide rail is disposed in at least one of the intersecting section of the travel path or the curved section of the travel path. This appropriately reduces a rise of the vehicle body of the transport vehicle in a section in which the vehicle body is likely to rise.

In this structure, the guide rail is not disposed in the straight section of the travel path. The rise restrictor thus does not come in contact with the guide rail lower surface while the transport vehicle is traveling in the straight section. This reduces the travel resistance of the transport vehicle in a section in which the vehicle body is less likely to rise.

Further aspects and advantages of the transport facility will be apparent from exemplary and nonlimiting embodiments described below with reference to the drawings.

DESCRIPTION OF THE INVENTION

Figure 1:
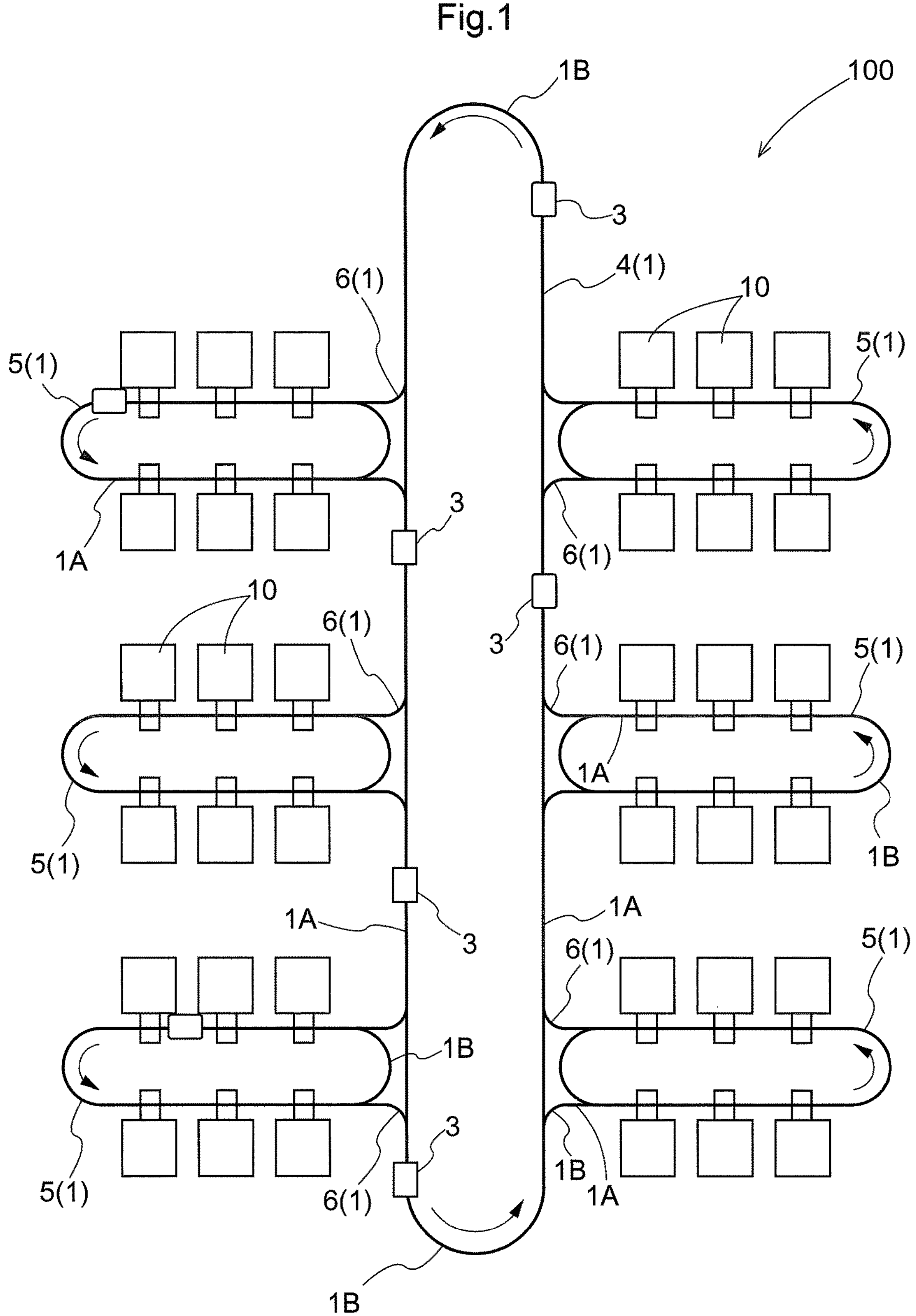
FIG. 1 is a schematic plan view of an overall travel path in a transport facility.

A transport facility according to one or more embodiments will be described with reference to the drawings.

As shown in FIGS. 1 to 5, a transport facility 100 includes travel rails 8 along a travel path 1, transport vehicles 3 that travel along the travel path 1, and guide rails 9 disposed along the travel path 1 separately from the travel rails 8 to guide the transport vehicles 3. In the present embodiment, the transport facility 100 further includes multiple processing devices 10. The processing devices 10 are arranged along the travel path 1. The transport vehicles 3 travel along the travel path 1 to transport articles W (refer to FIG. 4) to the respective processing devices 10. The transport vehicles 3 travel along the travel path 1 also to collect articles W from the respective processing devices 10. In the present example, the articles Ware containers for containing objects. More specifically, the articles W are each a front opening unified pod (FOUP) for containing a semiconductor substrate. However, the articles W are not limited to this example. In the example in FIG. 1, the processing devices 10 perform predetermined processing on the objects (semiconductor substrates in this example) contained in the articles W.

As shown in FIG. 1, the travel path 1 includes a looped primary path 4, multiple looped secondary paths 5 extending through the multiple processing devices 10, and connecting paths 6 connecting the primary path 4 to the secondary paths 5.

The transport vehicles 3 travel along the primary path 4 and the multiple secondary paths 5 in the same direction (counterclockwise in the example in FIG. 1). In FIG. 1, the arrows indicate the direction in which the transport vehicles 3 travel.

The travel path 1 includes straight paths 1A that are straight and curved paths 1B that are curved. The straight paths 1A and the curved paths 1B are arranged on the primary path 4 and each of the secondary paths 5. As described above, the travel path 1 is a combination of the straight paths 1A and the curved paths 1B. The transport vehicles 3 thus travel along the straight paths 1A and the curved paths 1B toward the respective processing devices 10.

Hereafter, the direction along the travel path 1 is referred to as a travel direction X, and the direction perpendicular to the travel direction X when viewed in the vertical direction is referred to as a width direction Y. The first side in the width direction Y is referred to as a first side Y1 in the width direction, and the second side in the width direction Y is referred to as a second side Y2 in the width direction.

The travel rails 8 extend throughout the travel path 1 of the transport vehicles 3. In the present embodiment, each travel rail 8 includes a first rail section 81 and a second rail section 82 spaced from each other in the width direction Y. The first rail section 81 and the second rail section 82 are at the same level in the vertical direction. The first rail section 81 and the second rail section 82 (hereafter also simply referred to as a pair of rails) support the transport vehicles 3. In this example, the first rail section 81 is on the first side Y1 in the width direction relative to the second rail section 82. In the present embodiment, the pair of rails are hung from a ceiling. The travel path 1 is defined along the ceiling. In other words, the transport vehicles 3 in the present embodiment are ceiling-hung transport vehicles. The transport vehicles 3 may be transport vehicles other than the ceiling-hung transport vehicles.

Figure 5:
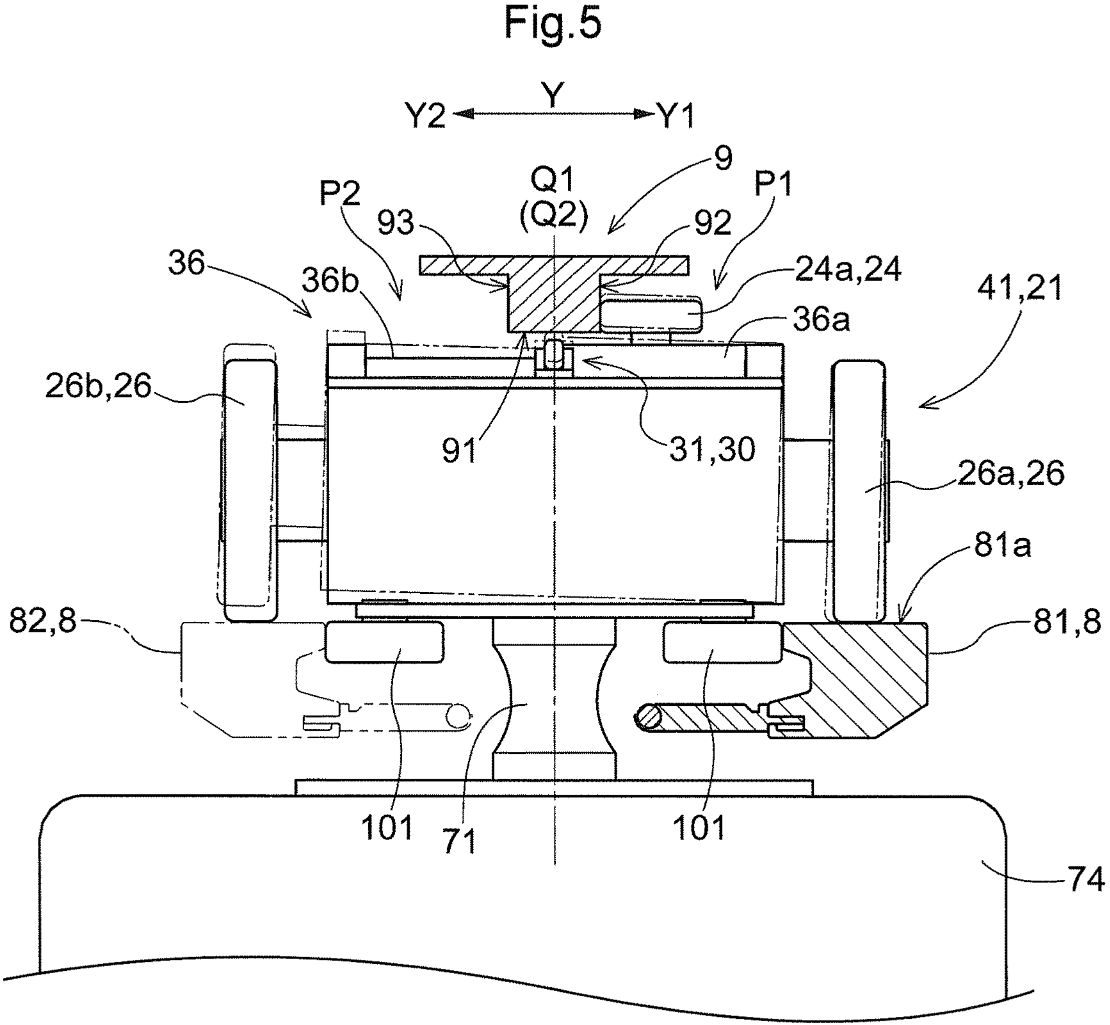
FIG. 5 is a front view of the transport vehicle.

As shown in FIG. 5, the guide rail 9 is between the first rail section 81 and the second rail section 82 in the width direction Y. In this example, the guide rail 9 is a single rail member. The guide rail 9 is at the middle position between the first rail section 81 and the second rail section 82 in the width direction Y The guide rail 9 is at a higher level than the pair of rails. The guide rail 9 may be at the same level as the pair of rails in the vertical direction.

Figure 2:
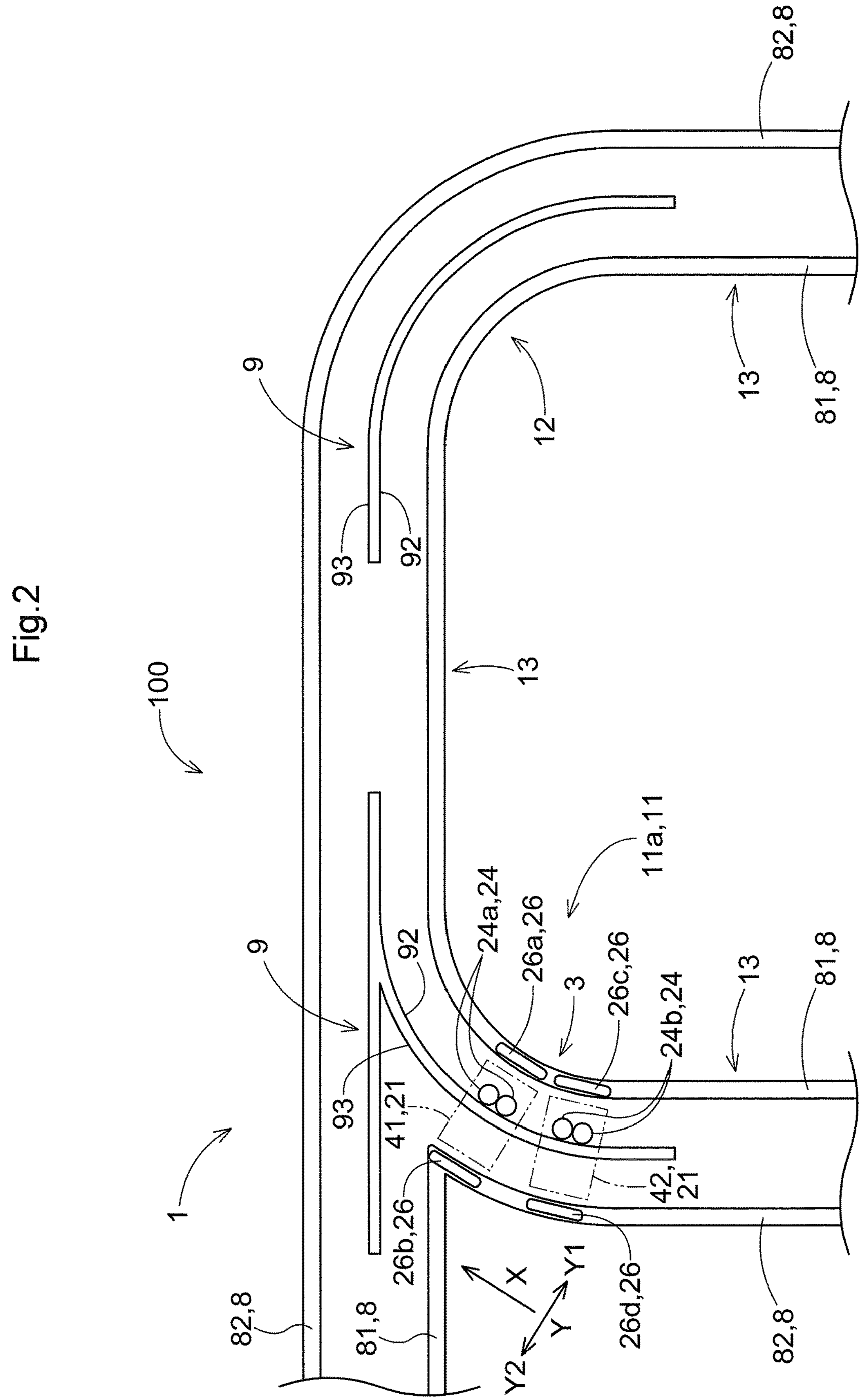
FIG. 2 is a plan view of an intersecting section, a straight section, and a curved section of the travel path.
Figure 3:
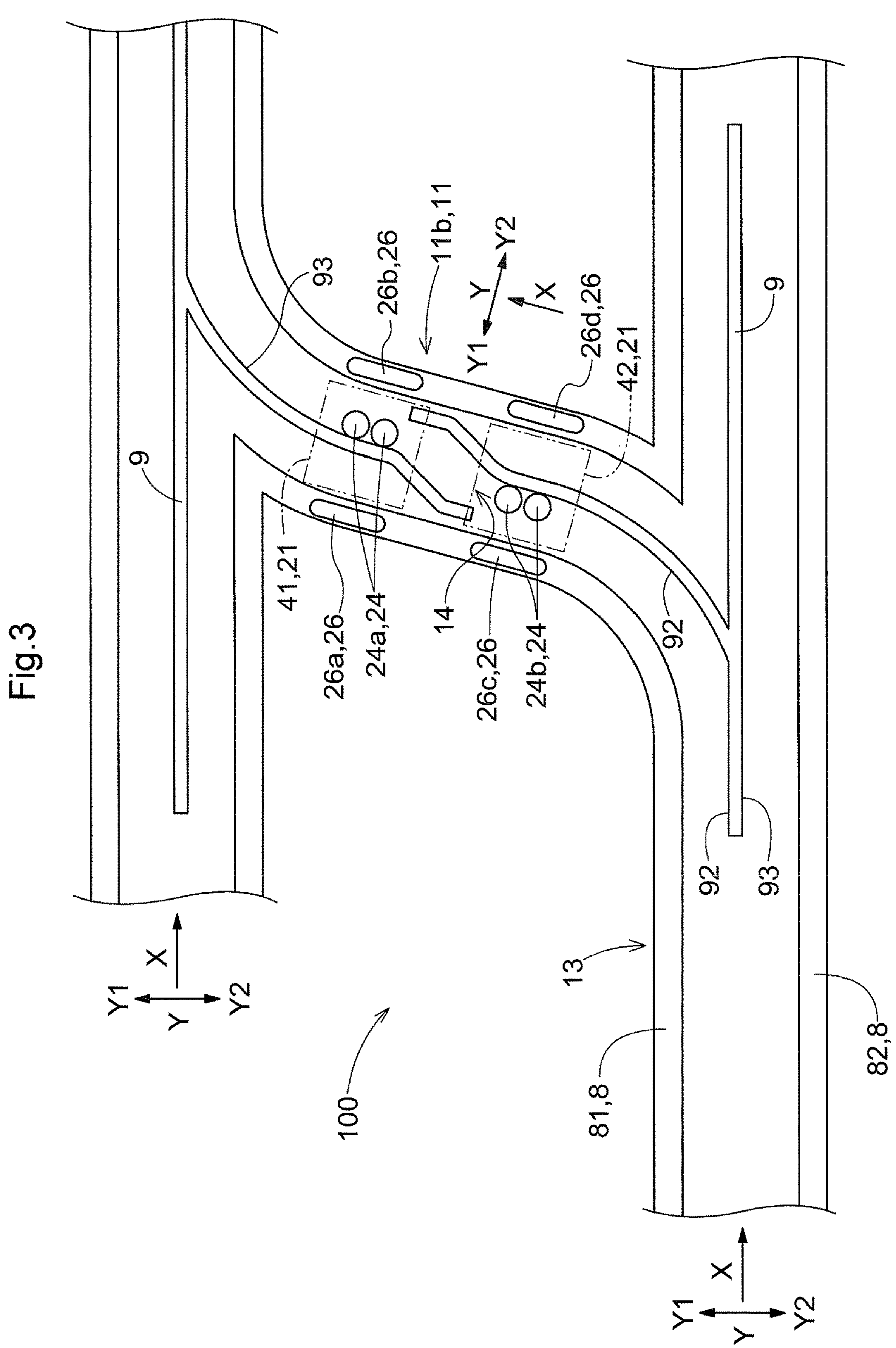
FIG. 3 is a plan view of an intersecting section of the travel path.

As shown in FIGS. 2 and 3, the guide rails 9 are disposed in at least one of a section 11 (hereafter referred to as an intersecting section 11) of the travel path 1 with an intersection or a section 12 (hereafter referred to as a curved section 12) of the travel path 1 with a curve. The guide rails 9 are not disposed in a section 13 (hereafter referred to as a straight section 13) of the travel path 1 in which the travel path 1 extends straight. As described above, the guide rails 9 are arranged in part of the travel path 1 without being arranged throughout the travel path 1.

In the present embodiment, the guide rails 9 are arranged in both the intersecting section 11 and the curved section 12 of the travel path 1 without being arranged in the straight section 13. As shown in FIG. 1, the intersecting section 11 is defined by a portion of the travel path 1 in which the travel rails 8 branch or merge. The intersecting section 11 is also defined by, in addition to the portion of the travel path 1 described above, the portion of the travel path 1 having an intersection to connect two different travel rails 8. The curved section 12 is defined as the section in which a single travel rail 8 curves on the travel path 1. FIGS. 2 and 3 show such examples.

FIG. 2 shows an example of the intersecting section 11 and the curved section 12. The intersecting section 11 in this example is a merging section 11*a* in which two travel rails 8 merge. The guide rails 9 are arranged in these sections.

In contrast, no guide rails 9 are arranged in the straight sections 13 other than in the intersecting section 11 and the curved section 12. FIG. 3 shows, as the intersecting section 11, a section in which the travel rails 8 branch from the straight section 13, and a section (hereafter referred to as an N-shaped junction section 11*b*) in which the branched travel rails 8 merge with other travel rails 8. The guide rails 9 are arranged in these sections. In contrast, no guide rails 9 are arranged in the straight sections 13 other than in the intersecting section 11. The N-shaped junction section 11*b* shown in FIG. 3 may also be used in a section in which two different travel rails 8 simply connect to each other, other than in the paths (e.g., branching paths or merging paths) shown in, for example, FIG. 1 in which the travel path 1 has intersections. As described above, the intersecting section 11, the curved section 12, and the straight section 13 are defined by the specific positional relationship between the travel rails 8 (a pair of rails in this example). The straight paths in FIG. 1 may thus each partially include the N-shaped junction section 11*b* shown in FIG. 3. Although not shown, the intersecting section 11 also includes a section in which the travel rails 8 intersect with each other in a cross shape or an X shape.

Figure 4:
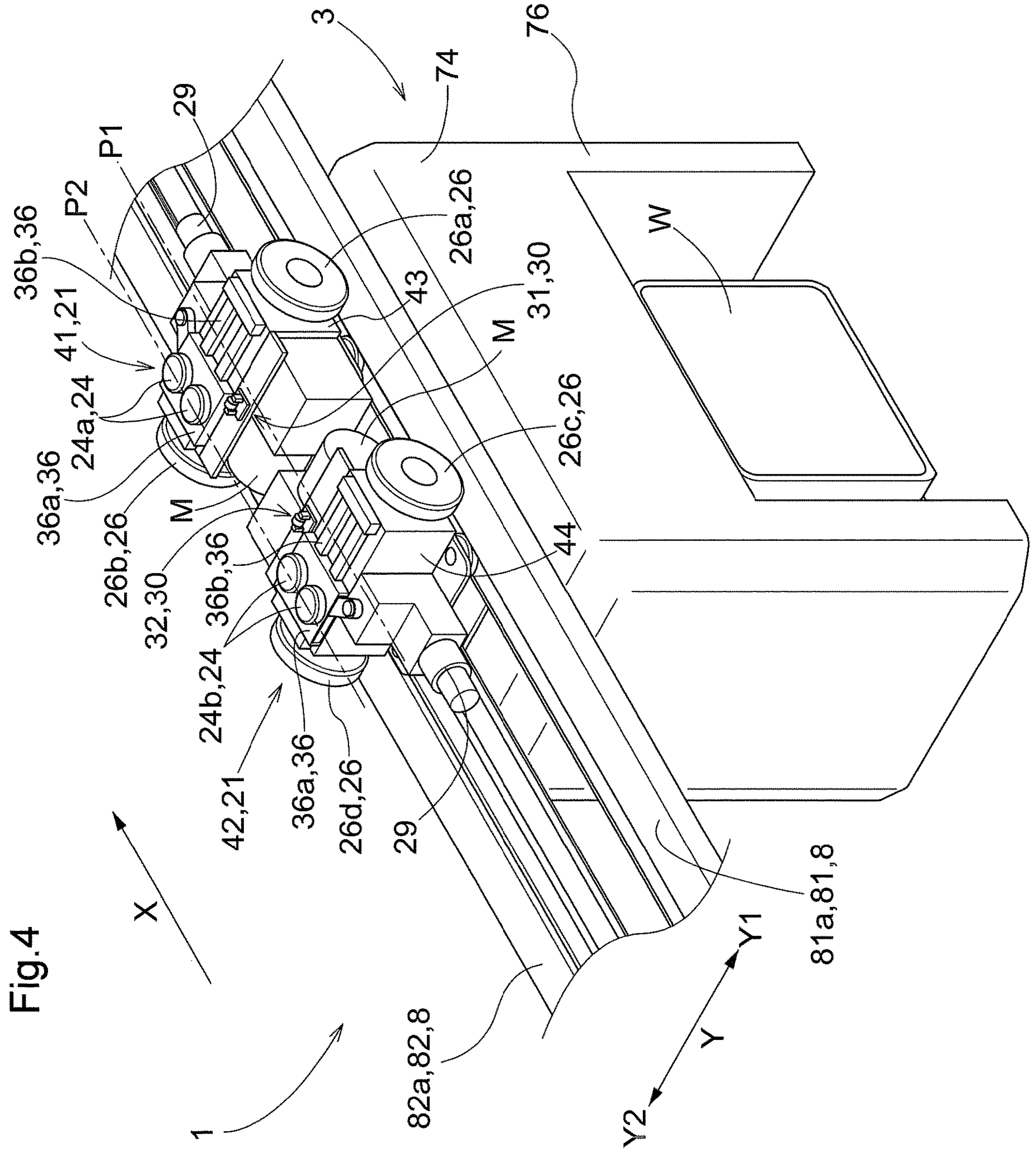
FIG. 4 is a perspective view of a transport vehicle and a travel rail.

As shown in FIGS. 4 and 5, the transport vehicle 3 includes a vehicle body 21, guided portions 24 guidable by the guide rails 9, travel wheels 26 supported on the vehicle body 21 to roll on the upper surfaces of the travel rails 8, and rise restrictors 30 supported on the vehicle body 21. The transport vehicle 3 further includes guide assist wheels 101 supported on the vehicle body 21. In the present example, the guided portions 24 are supported on the vehicle body 21.

As shown in FIGS. 4 and 5, the vehicle body 21 includes a coupler 74, a first support 41 supported on the coupler 74 in a manner rotatable about a first axis Q1 extending in the vertical direction, and a second support 42 spaced from the first support 41 in the travel direction X and supported on the coupler 74 in a manner rotatable about a second axis Q2 extending in the vertical direction. The vehicle body 21 includes multiple (two in this example) connecting shafts 71 each corresponding to the first support 41 or the second support 42. The first support 41 and the second support 42 are arranged in the travel direction X. In the present example, the first support 41 is in front of the second support 42 in the travel direction X. The first support 41 supports the coupler 74 from above with the corresponding connecting shaft 71 extending in the vertical direction. Similarly, the second support 42 supports the coupler 74 from above with the corresponding connecting shaft 71 (a connecting shaft 71 different from the connecting shaft 71 corresponding to the first support 41) extending in the vertical direction. Each connecting shaft 71 rotates about the corresponding axis extending in the vertical direction, allowing the first support 41 to be rotatable about the first axis Q1 and the second support 42 to be rotatable about the second axis Q2. In the present example, the first support 41 and the second support 42 are arranged above the travel rails 8, and the coupler 74 is disposed below the travel rails 8.

In the present example, the coupler 74 serves as the ceiling of a compartment 76 that accommodates the article W. The compartment 76 can hold the article W and lift and lower the article W. When the transport vehicle 3 stops at a position corresponding to the processing device 10 that is the destination of the article W, the compartment 76 lowers the article W from the compartment position and transfers the article W to the port of the processing device 10. The compartment 76 can also hold the article W placed on the port of the processing device 10 and lift the article W to the compartment position. The compartment position is the position at which the article W is held during the travel of the transport vehicle 3. In the example in FIG. 4, the article W at the compartment position is covered with a cover included in the compartment 76. As described above, in the present example, the transport vehicle 3 further includes the compartment 76. The compartment 76 is supported on the vehicle body 21 in a manner hung from the vehicle body 21.

The first support 41 and the second support 42 each support the multiple travel wheels 26.

In the present embodiment, as shown in FIGS. 4 and 5, the transport vehicle 3 includes, as the travel wheels 26, a first wheel 26*a* that rolls on an upper surface 81*a* of the first rail section 81 and a second wheel 26*b* that rolls on an upper surface 82*a* of the second rail section 82. The transport vehicle 3 includes, as the travel wheels 26, in addition to the first wheel 26*a* and the second wheel 26*b*, a third wheel 26*c* that rolls on the upper surface 81*a* of the first rail section 81 and a fourth wheel 26*d* that rolls on the upper surface 82*a* of the second rail section 82. The vehicle body 21 includes a travel wheel driver M (travel wheel drive motor) that drives at least one of the first wheel 26*a* to the fourth wheel 26*d*.

In the present embodiment, as shown in FIG. 4, the first support 41 supports the first wheel 26*a* and the second wheel 26*b*. The second support 42 supports the third wheel 26*c* and the fourth wheel 26*d*.

In the present example, the first support 41 supports a pair of guide assist wheels 101 spaced from each other in the width direction Y. Similarly, the second support 42 supports another pair of guide assist wheels 101 spaced from each other in the width direction. Each guide assist wheel 101 is rotatable about an axis extending in the vertical direction, and rolls on a side surface (one of the facing surfaces of the pair of rails) of the first rail section 81 or the second rail section 82 facing inward. The guide assist wheels 101 correspond one-to-one to the first wheel 26*a* to the fourth wheel 26*d*.

As shown in FIGS. 3 and 4, each guided portion 24 comes in contact with the side surface of the guide rail 9 facing in the width direction Y. As the transport vehicle 3 travels in the intersecting section 11 and the curved section 12, the guided portions 24 come in contact with one of the surfaces of the guide rail 9 facing the first side Y1 in the width direction (a first side surface 92 in the width direction) or facing the second side Y2 in the width direction (a second side surface 93 in the width direction). In the present embodiment, the guided portions 24 include a first guided portion 24*a* supported on the first support 41 and a second guided portion 24*b* supported on the second support 42. The first guided portion 24*a* and the second guided portion 24*b* are each disposed on the upper surface of the corresponding support (the first support 41 or the second support 42) with a linear guide unit 36 between the guided portions and the supports.

The first guided portion 24*a* and the second guided portion 24*b* are movable in the width direction Y More specifically, the first guided portion 24*a* and the second guided portion 24*b* are movable between a first position P1 and a second position P2. The second position P2 is on the second side Y2 in the width direction relative to the first position P1. The first position P1 is the position at which the first guided portion 24*a* and the second guided portion 24*b* come in contact with the first side surface 92 of the guide rail 9 in the width direction. The second position P2 is the position at which the first guided portion 24*a* and the second guided portion 24*b* come in contact with the second side surface 93 of the guide rail 9 in the width direction. The first guided portion 24*a* and the second guided portion 24*b* have the same structure. Thus, the structure of the first guided portion 24*a* will be described in detail, without the structure of the second guided portion 24*b* being described.

The first guided portion 24*a* is guided by the linear guide unit 36 to move between the first position P1 and the second position P2 in the width direction Y. In the present example, the first guided portion 24*a* includes multiple (two in this example) guide wheels that rotate about an axis extending in the vertical direction. In the illustrated example, the linear guide unit 36 is a linear guide. The multiple guide wheels are fixed to a slider 36*a* in the linear guide. The linear guide rails are fixed to the upper surface of the first support 41. The first support 41 includes a guide wheel driver 29 that drives the guide wheels. The guide wheel driver 29 drives the first guided portion 24*a* to move in the width direction Y. The first guided portion 24*a* and the second guided portion 24*b* may be sliding members other than such guide wheels.

As shown in FIGS. 2 and 3, when the transport vehicle 3 enters the intersecting section 11 or the curved section 12, the transport vehicle 3 moves the guided portions 24 to an appropriate position (the first position P1 or the second position P2) corresponding to the travel direction. In the merging section 11*a* and the curved section 12 in FIG. 2, the guided portions 24 in the transport vehicle 3 that has entered such sections are in contact with the first side surface 92 in the width direction. In the N-shaped junction section 11*b* in FIG. 3, the transport vehicle 3 switches the position of the guided portions 24 from the first position P1 to the second position P2 during its travel. In the example in FIG. 3, two guide rails 9 are arranged substantially in series in the N-shaped junction section 11*b*. However, the N-shaped junction section 11*b* includes an overlapping section 14 in which the two guide rails 9 overlap each other in the travel direction X. The overlapping section 14 is in a middle area of the branching path in the travel direction X in the N-shaped junction section 11*b*. In the illustrated example, the transport vehicle 3 switches the position of the guided portions 24 from the first position P1 to the second position P2 in the overlapping section 14. This changes the contact surface of the guided portions 24 from the first side surface 92 in the width direction to the second side surface 93 in the width direction.

Figure 6:
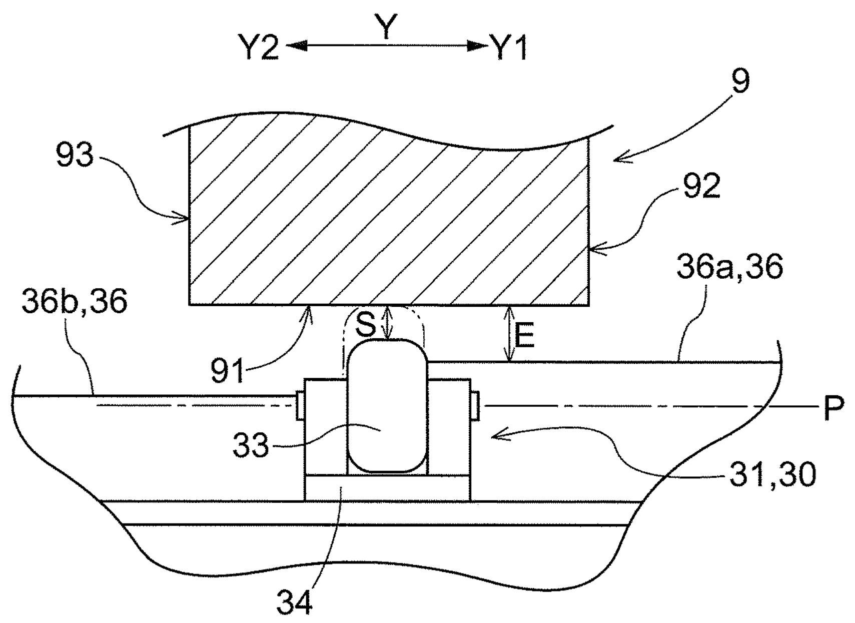
FIG. 6 is an enlarged view of a rise restrictor, showing its main portion.

As shown in FIGS. 4 to 6, each rise restrictor 30 faces a guide rail lower surface 91 from below in a section in which the guide rail 9 is disposed. The guide rail lower surface 91 is a downward-facing surface of the guide rail 9. The rise restrictor 30 comes in contact with the guide rail lower surface 91 from below in response to a rise of the vehicle body 21.

As shown in FIGS. 4 and 5, the rise restrictor 30 is between the first wheel 26*a* and the second wheel 26*b* in the width direction Y In the present example, the rise restrictor 30 overlaps the guide rail 9 when viewed in the vertical direction. In other words, the rise restrictor 30 is disposed in the middle in the width direction Y between the first wheel 26*a* and the second wheel 26*b*. The rise restrictor 30 and these wheels are at different levels in the vertical direction. In this example, the rise restrictor 30 is at a higher level than the wheels. The rise restrictor 30 and the wheels may be at the same level in the vertical direction. In the present embodiment, the rise restrictor 30 is in an upper portion of the vehicle body 21.

In the present embodiment, the rise restrictor 30 is a rotator supported in a manner rotatable at least about an axis P extending in the width direction Y. In this example, the rise restrictor 30 is a rise restricting wheel 33 (FIG. 6) rotatable about the axis P extending in the width direction Y The rise restricting wheel 33 rolls on the guide rail lower surface 91 while being in contact with the guide rail lower surface 91. As shown in FIG. 4, the transport vehicle 3 includes a first rise restrictor 31 and a second rise restrictor 32 each as the rise restrictor 30. The first wheel 26*a*, the second wheel 26*b*, and the first rise restrictor 31 are supported on the first support 41. The third wheel 26*c*, the fourth wheel 26*d*, and the second rise restrictor 32 are supported on the second support 42. Additionally, as described above, the multiple guide assist wheels 101 each corresponding to the first wheel 26*a* or the second wheel 26*b* are supported on the first support 41, and the multiple guide assist wheels 101 each corresponding to the third wheel 26*c* or the fourth wheel 26*d* are supported on the second support 42. In the example in FIG. 6, the rise restrictor 30 (the first rise restrictor 31 or the second rise restrictor 32) is on the upper surface of the support (the first support 41 or the second support 42) with a support member 34 supporting the rise restricting wheel 33 between the rise restrictor 30 and the support. The first rise restrictor 31 and the second rise restrictor 32 are arranged between (inward from) the first guided portion 24*a* and the second guided portion 24*b* in the travel direction X.

In the present embodiment, as shown in FIG. 6, the rise restrictor 30 faces the guide rail lower surface 91 across a space S. The space S is set to less than a smallest gap E between the guide rail lower surface 91 and a member attached to the vehicle body 21 and facing the guide rail lower surface 91. In this example, the member facing the guide rail lower surface 91 is the linear guide unit 36 supporting the guided portion 24. In other words, the space S has a vertical dimension smaller than the gap E between the guide rail lower surface 91 and the linear guide unit 36 (more specifically, the slider 36*a*). Thus, when the vehicle body 21 rises, the rise restrictor 30 comes in contact with the guide rail lower surface 91. The other members of the vehicle body 21, such as the linear guide unit 36, can thus avoid coming in contact with the guide rail 9. The positions (the first position P1 and the second position P2) of the guided portions 24 may be switched by a unit other than the linear guide unit 36. In this case, the member facing the guide rail lower surface 91 may be another position switching unit. The member facing the guide rail lower surface 91 may be the travel wheel driver M. In the present embodiment, the transport vehicle 3 includes a control device (not shown) for controlling the travel wheel driver M and the guide wheel driver 29 (FIG. 4). The control device controls the travel wheel driver M and the guide wheel driver 29 based on commands from a host controller that centrally manages the transport facility. The control device also controls each compartment 76 to allow the transport vehicle 3 to appropriately transfer the article W to the transfer target location.

In the intersecting section 11 (in the illustrated example, the merging section 11*a* or the N-shaped junction section 11*b*) and the curved section 12 as shown in FIGS. 2 and 3, errors in the installation position of the travel rails 8 or the guide rail 9 may cause the vehicle body 21 to rise relative to its horizontal orientation. When the vehicle body 21 rises, a member (the linear guide unit 36 supporting the guided portions 24 in this example) of the vehicle body 21 may come in contact with the guide rail 9. When the traveling vehicle body 21 comes in contact with the guide rail 9, the vehicle body 21 may be damaged or the transport vehicle 3 may degrade earlier than expected. The rise of the vehicle body 21 or vibration resulting from the vehicle body 21 coming in contact with the guide rail 9 may also damage the object contained in the article W (container).

In the example in FIG. 5, the transport vehicle 3 travels in the intersecting section 11 without the second rail section 82 that is one of the pair of rails. In the illustrated example, without the second rail section 82, the second wheel 26*b* is derailed. In this case as well, the guide assist wheel 101 is in contact with the inner side surface of the first rail section 81, with the guided portion 24 (guide wheels in this example) in contact with the first side surface 92 of the guide rail 9 in the width direction. This restricts movement of the vehicle body 21 in the width direction Y. Additionally, the first wheel 26*a* is supported on the upper surface 81*a* of the first rail section 81, thus restricting movement of the vehicle body 21 in the vertical direction. The vehicle body 21 can thus remain in the horizontal orientation (as indicated by solid lines in FIG. 5). In contrast, any error in the installation position of the travel rail 8 or the guide rail 9 can easily cause the vehicle body 21 to rise relative to its horizontal orientation (as indicated by two-dot-dash lines in FIG. 5). In the illustrated example, the vehicle body 21 (specifically, the first support 41) is tilted in the width direction Y. The vehicle body 21 may have another rising state of, for example, the first support 41 rising relative to the second support 42 when the transport vehicle 3 travels in, for example, a section in which one of the pair of rails is not continuously disposed as described above or in the overlapping section 14 of the N-shaped junction section 11*b*. In the present embodiment, in response to such a rise of the vehicle body 21, the rise restrictor 30 (the first rise restrictor 31 in this example) comes in contact with the guide rail lower surface 91. The vehicle body 21 can thus avoid contact with the guide rail 9. In contrast, the guide rail 9 is not disposed in the straight section 13 in which the installation position of the travel rails 8 has relatively fewer errors. Thus, the rise restrictor 30 does not come in contact with the guide rail 9. This reduces the travel resistance of the transport vehicle 3 traveling in the straight section 13, thus increasing the transport efficiency of the articles W in the overall facility.

OTHER EMBODIMENTS (1) In the above embodiment, when the vehicle body 21 rises, the rise restrictor 30 comes in contact with the guide rail lower surface 91 from below. However, the structure is not limited to this example. The rise restrictor 30 may be constantly in contact with the guide rail lower surface 91, independently of a rise of the vehicle body 21.

(2) In the above embodiment, the space S is set to less than the smallest gap E between the guide rail lower surface 91 and the member attached to the vehicle body 21 and facing the guide rail lower surface 91. However, the structure is not limited to this example. The space S may be set to substantially the same as the smallest gap E between the guide rail lower surface 91 and the member attached to the vehicle body 21 and facing the guide rail lower surface 91.

(3) In the above embodiment, the rise restrictor 30 is a rotator rotatable about the axis P extending in the width direction Y However, the structure is not limited to this example. The rise restrictor 30 may be, for example, a ball caster rotatable about an axis extending in any direction.

(4) In the above embodiment, the rise restrictor 30 is between the first wheel 26*a* and the second wheel 26*b* in the width direction Y. However, the structure is not limited to this example. The rise restrictor 30 may be disposed outward from the first wheel 26*a* or the second wheel 26*b* in the width direction Y. The position of the rise restrictor 30 can be changed as appropriate.

(5) In the above embodiment, the vehicle body 21 includes the first support 41 and the second support 42. However, the structure is not limited to this example. The vehicle body 21 may include the first support 41 alone. The vehicle body 21 may include, in addition to the first support 41 and the second support 42, a third support. In this manner, the number of supports included in the vehicle body 21 may be changed as appropriate.

(6) The structure described in each of the above embodiments may be combined with any other structures described in the other embodiments (embodiments described as other embodiments may also be combined) unless any contradiction arises. The embodiments described herein are merely illustrative in all aspects and may be modified variously as appropriate without departing from the spirit and scope of the disclosure. Thus, the embodiments described herein may be modified variously as appropriate without departing from the spirit and scope of the disclosure.

OVERVIEW OF EMBODIMENTS

An overview of the transport facility described above is provided below.

A transport facility according to an embodiment of the disclosure includes a travel rail along a travel path, a transport vehicle that travels along the travel path, and a guide rail disposed along the travel path separately from the travel rail to guide the transport vehicle. The transport vehicle includes a vehicle body, a guided portion guidable by the guide rail, at least one travel wheel supported on the vehicle body to be rollable on an upper surface of the travel rail, and a at least one restrictor supported on the vehicle body. The guide rail is disposed in at least one of an intersecting section of the travel path or a curved section of the travel path without being disposed in a straight section of the travel path. The at least one rise restrictor faces, from below, a guide rail lower surface being a downward-facing surface of the guide rail in a section in which the guide rail is disposed. The at least one rise restrictor comes in contact with the guide rail lower surface from below in response to a rise of the vehicle body.

In this structure, in the section of the travel path in which the guide rail is disposed, the rise restrictor may come in contact with the guide rail lower surface from below when the vehicle body starts rising, restricting the rise of the vehicle body. This reduces damage or degradation of the components of the transport vehicle resulting from a rise of the vehicle body.

In this structure, the guide rail is disposed in at least one of the intersecting section of the travel path or the curved section of the travel path. This appropriately reduces a rise of the vehicle body of the transport vehicle in a section in which the vehicle body is likely to rise.

In this structure, the guide rail is not disposed in the straight section of the travel path. The rise restrictor thus does not come in contact with the guide rail lower surface while the transport vehicle is traveling in the straight section. This reduces the travel resistance of the transport vehicle in a section in which the vehicle body is less likely to rise.

The at least one rise restrictor may face the guide rail lower surface across a space. The space may be set to less than a smallest gap between the guide rail lower surface and a member attached to the vehicle body and facing the guide rail lower surface.

In this structure, in response to the vehicle body rising in a section with the guide rail, the rise restrictor comes in contact with the guide rail lower surface from below. Thus, any member attached to the vehicle body other than the rise restrictor can avoid contact with the guide rail.

The at least one rise restrictor may be a rotator supported in a manner rotatable at least about an axis extending in a width direction perpendicular to a travel direction when viewed in a vertical direction. The travel direction may be along the travel path.

This structure easily reduces frictional resistance between the rise restrictor and the guide rail lower surface when the rise restrictor comes in contact with the guide rail lower surface from below. The transport vehicle can thus travel with less resistance with the rise restrictor restricting a rise of the vehicle body.

The travel rail may include a first rail section and a second rail section spaced from each other in a width direction perpendicular to a travel direction when viewed in a vertical direction. The travel direction may be along the travel path. The guide rail may be between the first rail section and the second rail section in the width direction. The at least one travel wheel may include a first wheel and a second wheel. The first wheel may be rollable on an upper surface of the first rail section. The second wheel may be rollable on an upper surface of the second rail section. The at least one rise restrictor may be between the first wheel and the second wheel in the width direction.

In this structure, the rise restrictor is between the first wheel and the second wheel that are spaced from each other in the width direction, stably supporting the vehicle body when the vehicle body rises.

The vehicle body may include a coupler, a first support supported on the coupler in a manner rotatable about a first axis extending in a vertical direction, and a second support spaced from the first support in the travel direction and supported on the coupler in a manner rotatable about a second axis extending in the vertical direction. The at least one travel wheel may further include a third wheel and a fourth wheel. The third rail may be rollable on the upper surface of the first rail. The fourth rail may be rollable on the upper surface of the second rail. The at least one rise restrictor may include a first rise restrictor and a second rise restrictor. The first wheel, the second wheel, and the first rise restrictor may be supported on the first support. The third wheel, the fourth wheel, and the second rise restrictor may be supported on the second support.

In this structure, the first support and the second support spaced from each other in the travel direction respectively support a pair of travel wheels. The first rise restrictor and the second rise restrictor can both restrict a rise of the vehicle body. This structure thus can restrict a rise of the vehicle body more stably.

The transport facility according to one or more embodiments of the disclosure produces at least one of the effects described above.

What is claimed is:

1. A transport facility, comprising:
a travel rail along a travel path;
a transport vehicle configured to travel along the travel path; and
a guide rail disposed along the travel path separately from the travel rail, the guide rail configured to guide the transport vehicle, and
wherein:
the transport vehicle comprises:
a vehicle body,
a guided portion guidable by the guide rail,
at least one travel wheel supported on the vehicle body, the at least one travel wheel being rollable on an upper surface of the travel rail, and
at least one rise restrictor supported on the vehicle body,
the guide rail is disposed in at least one of an intersecting section of the travel path or a curved section of the travel path without being disposed in a straight section of the travel path,
the at least one rise restrictor is provided separately from the guided portion and configured to face, from below, a guide rail lower surface that is a downward-facing surface of the guide rail in a section in which the guide rail is disposed, and the at least one rise restrictor is configured to come in contact with the guide rail lower surface from below in response to a rise of the vehicle body.

2. The transport facility according to claim 1, wherein:
the at least one rise restrictor faces the guide rail lower surface across a space, and
the space is set to less than a smallest gap between the guide rail lower surface and a member attached to the vehicle body and facing the guide rail lower surface.

3. A transport facility comprising:
a travel rail along a travel path;
a transport vehicle configured to travel along the travel path; and
a guide rail disposed along the travel path separately from the travel rail, the guide rail configured to guide the transport vehicle, and
wherein:
the transport vehicle comprises:
a vehicle body,
a guided portion guidable by the guide rail,
at least one travel wheel supported on the vehicle body, the at least one travel wheel being rollable on an upper surface of the travel rail, and
at least one rise restrictor supported on the vehicle body,
the guide rail is disposed in at least one of an intersecting section of the travel path or a curved section of the travel path without being disposed in a straight section of the travel path,
the at least one rise restrictor is configured to face, from below, a guide rail lower surface that is a downward-facing surface of the guide rail in a section in which the guide rail is disposed, and the at least one rise restrictor is configured to come in contact with the guide rail lower surface from below in response to a rise of the vehicle body,
the at least one rise restrictor is a rotator supported in a manner rotatable at least about an axis extending in a width direction perpendicular to a travel direction when viewed in a vertical direction, and the travel direction is along the travel path.

4. The transport facility according to claim 1, wherein:
the travel rail comprises a first rail section and a second rail section spaced from each other in a width direction perpendicular to a travel direction when viewed in a vertical direction, and the travel direction is along the travel path,
the guide rail is between the first rail section and the second rail section in the width direction,
the at least one travel wheel comprises a first wheel rollable on an upper surface of the first rail section and a second wheel rollable on an upper surface of the second rail section, and
the at least one rise restrictor is between the first wheel and the second wheel in the width direction.

5. The transport facility according to claim 4, wherein:
the vehicle body comprises:
a coupler,
a first support supported on the coupler in a manner rotatable about a first axis extending in a vertical direction, and
a second support spaced from the first support in the travel direction and supported on the coupler in a manner rotatable about a second axis extending in the vertical direction,
the at least one travel wheel further comprises a third wheel rollable on the upper surface of the first rail section and a fourth wheel rollable on the upper surface of the second rail section,
the at least one rise restrictor comprises a first rise restrictor and a second rise restrictor,
the first wheel, the second wheel, and the first rise restrictor are supported on the first support, and
the third wheel, the fourth wheel, and the second rise restrictor are supported on the second support.

* * * * *